April 3, 1945.                C. F. BALL                2,372,925
                                FLIGHT
                         Filed May 31, 1943
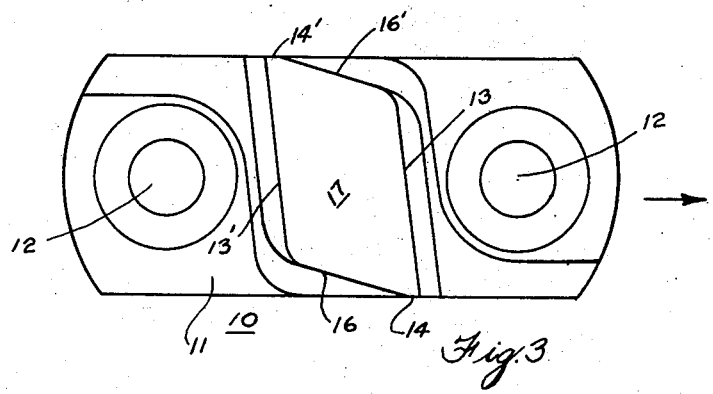
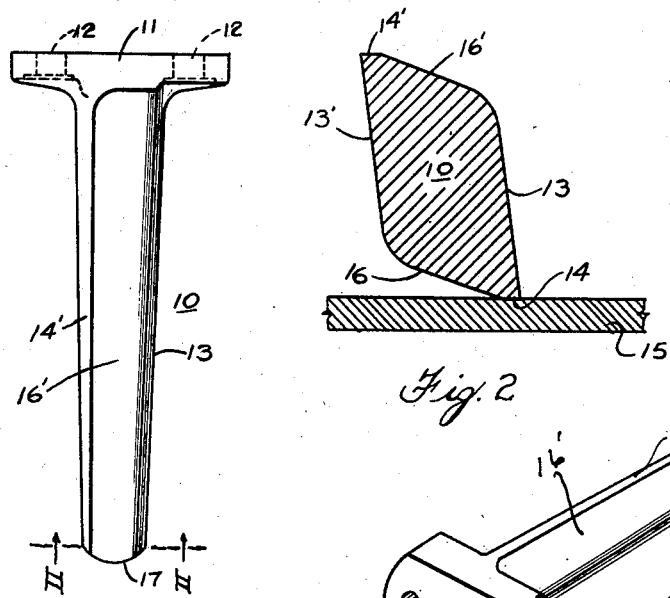
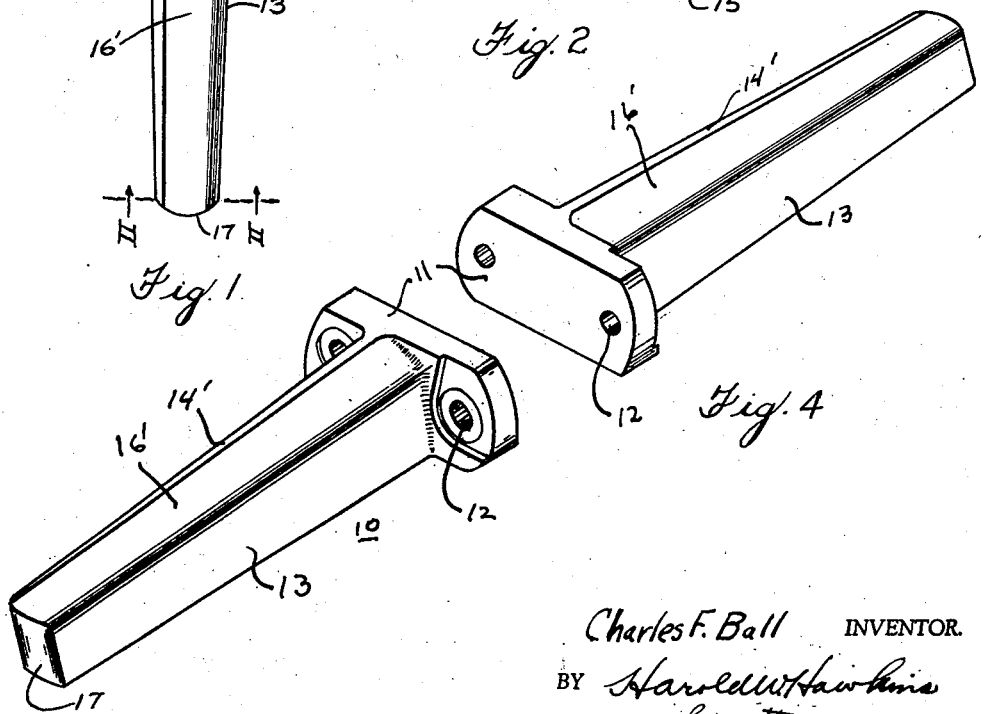
Charles F. Ball  INVENTOR.
BY Harold W. Hawkins
   his attorney.

Patented Apr. 3, 1945

2,372,925

UNITED STATES PATENT OFFICE 2,372,925

FLIGHT

Charles F. Ball, Franklin, Pa., assignor to Joy Manufacturing Company, a corporation of Pennsylvania Application May 31, 1943, Serial No. 489,234

5 Claims. (Cl. 198—171)

This invention relates to new and useful improvements in material carrying flights such as are used in conveyors of the scraper type.

The principal object of this invention is to provide a conveying flight of the character adapted to project laterally from a single strand of conveyor chain in position to engage and propel material along the conveyor trough which is of such form and shape as to be forced by the material it engages into contact with the conveyor trough to scrape the material from the trough and prevent the clogging or building up of the material thereon which, if not loosened and removed, would adhere to or frictionally engage the trough and cause the flights to be dragged over the surface thereof.

Another object is to provide a conveying flight of substantially rhombical shape in section to provide a relatively sharp trough engaging portion on opposite edges where the sides form an acute angle so that the flight can be reversed when one trough engaging portion becomes worn and the life of the flight materially increased.

A further object is to provide a conveying flight which is sturdy and rugged in construction, inexpensive to manufacture and positive in operation.

These and other objects which will hereinafter be made apparent to those skilled in this particular art are accomplished by means of this invention, one embodiment of which is described in the following specification and illustrated in the accompanying drawing, wherein:

Fig. 1 is a top plan view of a conveying flight made in accordance with my invention;

Fig. 2 is a section taken on line II—II of Fig. 1;

Fig. 3 is an enlarged end elevation of the flight shown in Fig. 1, looking at the front or outer end thereof, and Fig. 4 is a perspective view of my improved flight.

Referring particularly to the drawing, 10 illustrates a conveying flight of the type adapted to project laterally from a single strand of conveyor chain, having a base 11 which is provided with openings 12 through which the pins (not shown) of the conveyor chain project for securing the flight to the side of the conveyor chain.

The body of the flight 10 is of substantially rhombical shape in section and has an upwardly and rearwardly inclined forward face 13 for engaging the material being conveyed as the flight moves in the direction indicated by the arrow in Fig. 3. As the flight 10 moves against the material being conveyed, the material thrusting against the forward inclined surface 13 forces the flight downward and holds a relatively narrow flat face 14 on the bottom of the flight in scraping engagement with the conveyor trough represented at 15 in Fig. 2.

The relatively narrow face 14 forms the juncture between the forward face 13 and upwardly and rearwardly inclined bottom face 16. The faces 13 and 16 incline upwardly and rearwardly from a common point and form in effect a wedge which forces the face 14 into engagement with the conveyor trough and prevents the flight from "riding" on small pieces of material being propelled along the trough.

Since the flight 10 is of substantially rhombical shape in section, the opposite faces of the flight are parallel to the faces 13, 14 and 16 and complementary inclined faces 13' and 16', joined by a narrow flat face 14', are provided on the flight which permits it to be reversed or turned over to bring the face 14' into engagement with the conveyor trough. The outer end of the flight 10 has a rounded surface 17 to facilitate movement of the end of the conveying flight along the side walls of the conveyor trough.

From the foregoing description of my invention, it is apparent that a conveying flight made in accordance with my invention is particularly adapted for handling certain types of "sticky" materials which have a tendency to harden or pack in the conveyor trough since the relatively narrow face 14—14' acts as a blade to scrape or loosen the material from the trough and maintain it in such loose condition for travel along the conveyor trough. Thus the flight scrapes the conveyor trough clean and dragging of the flights over material adhering to the trough is eliminated.

Further, since my improved conveying flight is of substantially rhombical shape in section, as soon as the face 14 becomes worn, the flight can be reversed to bring the face 14' into contact with the conveyor trough and the flight used until the face 14' is worn away before it must be discarded so that the life of my improved flight is about twice the life of the ordinary flight.

While I have illustrated and described my improved flight as having a relatively narrow flat face between the forward and bottom faces, it should be understood that these two faces can be joined by a sharp corner, if desired, without departing from my invention since such a corner would soon wear down and provide the flat trough engaging face of my preferred embodiment.

Further, various other modifications in detail may be made to meet any particular requirement without departing from the spirit of my invention or the scope of the appended claims.

What I claim as new and desire to secure by Letters Patent is:

1. A reversible scraper conveying flight having a body of substantially rhombical shape provided with an inclined forward face, an inclined bottom face, a relatively narrow trough scraping face forming the juncture between said forward and bottom faces and a like face parallel to each of the aforesaid faces and apertured lugs at one end of said body for attaching said flight to a single-strand conveyor chain.

2. A reversible conveying flight having a body of substantially rhombical shape in section provided with an upwardly and rearwardly inclined forward face, an upwardly and rearwardly inclined bottom face and a relatively narrow trough scraping face at the juncture between said forward and bottom faces and an apertured base on said body for attaching the flight to the pins of a single-strand conveyor chain.

3. A reversible scraper flight for a chain conveyor, comprising a body, having an apertured base for attaching it to the pins of a conveyor chain, said body being of substantially rhombical shape in section, and having an upwardly inclined forward face, a rear face parallel to said forward face, an upwardly inclined bottom face, a face parallel to said bottom face, a relatively narrow trough scraping face joining said forward and bottom faces and a face parallel to said trough scraping face joining the faces parallel to said forward and bottom faces and adapted to become the trough scraping face on reversal of said flight.

4. A conveying flight having a body provided with an apertured base for attaching the flight to a single strand conveyor chain, an upwardly and rearwardly inclined forward material engaging face, a second material engaging face parallel to said forward face, an upwardly and rearwardly inclined bottom face, a face parallel to said bottom face, a relatively narrow flat trough engaging face joining the forward and bottom faces, and a relatively narrow flat face parallel to said trough engaging face and joining the second material engaging face and the face parallel to said bottom face, said last mentioned face being adapted to become the trough engaging face on reversal of said flight.

5. A reversible scraper for a chain conveyor, comprising a body of substantially rhombical shape in section, having the corners adjacent the acute angles thereof cut away to provide relatively narrow opposed parallel trough scraping surfaces thereon.

CHARLES F. BALL.